US012282937B2

(12) United States Patent
Rosner et al.

(10) Patent No.: US 12,282,937 B2
(45) Date of Patent: Apr. 22, 2025

(54) SYSTEMS AND METHODS FOR PAYMENT PRODUCT VERIFICATION AND AUTHORIZATION USING A CUSTOMER IDENTIFIER

(71) Applicant: JPMORGAN CHASE BANK, N.A., New York, NY (US)

(72) Inventors: Jonathan Rosner, White Plains, NY (US); David Christopher Carey, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 126 days.

(21) Appl. No.: 17/513,536

(22) Filed: Oct. 28, 2021

(65) Prior Publication Data
US 2022/0138803 A1    May 5, 2022

Related U.S. Application Data

(60) Provisional application No. 63/108,748, filed on Nov. 2, 2020.

(51) Int. Cl.
*G06Q 30/02* (2023.01)
*G06Q 20/40* (2012.01)
(Continued)

(52) U.S. Cl.
CPC ..... *G06Q 30/0269* (2013.01); *G06Q 20/4014* (2013.01); *G06Q 30/0201* (2013.01); *G06Q 30/0224* (2013.01)

(58) Field of Classification Search
CPC ........... G06Q 30/0269; G06Q 20/4014; G06Q 30/0201; G06Q 30/0224; G06Q 20/3255;
(Continued)

(56) References Cited

U.S. PATENT DOCUMENTS 7,716,129 B1 * 5/2010 Tan ......................... G06Q 20/04
705/40
8,577,801 B2 * 11/2013 Armes .................. G06Q 20/10
705/40
(Continued)

FOREIGN PATENT DOCUMENTS

AU    2004252824 A1 *  1/2005
AU    2001257280 C1 *  1/2009   ............... G07F 7/12
(Continued)

OTHER PUBLICATIONS

"How many credit card issuers are there in the world" Google Query.*

(Continued)

*Primary Examiner* — Marilyn G Macasiano
(74) *Attorney, Agent, or Firm* — GREENBERG TRAURIG LLP (57) ABSTRACT

Systems, methods, and devices for payment product verification and authorization using a customer identifier are disclosed. In some aspects, techniques described herein relate to receiving, by a payment product provider and from a payment processor, a customer identifier; querying a datastore of customers of the payment product provider with a parameterized query, where the customer identifier is a parameter of the query; determining, based on the query, that the customer identifier is associated with customer profile data of the payment product provider; determining payment product data associated with the customer profile data; returning, by the payment product provider and to the payment processor, a positive eligibility indication based on the customer profile data and the payment product data; receiving, by the payment product provider and from the payment processor, a customer approval indication; and (Continued)

sending, by the payment product provider and to the payment processor, the payment product data.

14 Claims, 4 Drawing Sheets

(51) Int. Cl.
 *G06Q 30/0201* (2023.01)
 *G06Q 30/0207* (2023.01)
 *G06Q 30/0251* (2023.01)

(58) Field of Classification Search
 CPC .. G06Q 20/385; G06Q 30/02; G06Q 30/0254; G06Q 10/067; G06Q 30/0246; G06Q 30/0207
 See application file for complete search history.

(56) References Cited

U.S. PATENT DOCUMENTS

| | | | | |
|---|---|---|---|---|
| 2008/0154770 | A1* | 6/2008 | Rutherford | G07F 7/1008 705/44 |
| 2012/0310826 | A1* | 12/2012 | Chatterjee | G06Q 20/36 705/41 |
| 2013/0144783 | A1* | 6/2013 | Bishop | G06Q 40/02 705/42 |
| 2013/0212654 | A1* | 8/2013 | Dorfman | H04L 67/02 726/5 |
| 2016/0358139 | A1* | 12/2016 | Keys | G06Q 20/385 |
| 2017/0061441 | A1* | 3/2017 | Kamal | G06Q 20/326 |
| 2019/0132308 | A1* | 5/2019 | Graham | H04L 63/0876 |
| 2020/0090184 | A1* | 3/2020 | Kallugudde | G06Q 20/4014 |
| 2021/0019755 | A1* | 1/2021 | Omojola | G06Q 20/12 |
| 2021/0125194 | A1* | 4/2021 | Holland, IV | H04L 9/3268 |

FOREIGN PATENT DOCUMENTS

| | | | | |
|---|---|---|---|---|
| CA | 3007992 | A1 * | 12/2018 | G06Q 20/38 |
| EP | 2974122 | B1 * | 3/2021 | H04L 9/30 |
| WO | WO 2002/017181 | A1 * | 2/2002 | G06Q 20/00 |

OTHER PUBLICATIONS

Hannan Xiao; B. Christianson; Ying Zhang, A Purchase Protocol with Live Cardholder Authentication for Online Credit Card Payment(English), 2008 The Fourth International Conference on Information Assurance and Security (pp. 15-20), Oct. 24, 2008 (Year: 2008).*

S. Devane; M. Chatterjee; D. Ohatak, Secure E-Commerce Protocol for Purchase of e-goods-using Smart Card (English), Third International Symposium on Information Assurance and Security (pp. 9-14), Oct. 25, 2008 (Year: 2008).*

Pensri Pukkasenunk; Suphat Sukkasem, An Efficient of Secure Mobile Phone Application for Multiple Bill Payments (English), 2016 30th International Conference on Advanced Information Networking and Applications Workshops (WAINA) (2016, pp. 487-492 ), Mar. 1, 2016 (Year: 2016).*

* cited by examiner

SYSTEMS AND METHODS FOR PAYMENT PRODUCT VERIFICATION AND AUTHORIZATION USING A CUSTOMER IDENTIFIER

RELATED APPLICATIONS

This application claims priority to, and the benefit of, U.S. Provisional Patent Application Ser. No. 63/108,748, filed Nov. 2, 2020, the disclosure of which is hereby incorporated, by reference, in its entirety.

BACKGROUND OF THE INVENTION

1. Field of the Invention

Embodiments are generally directed to systems and methods for payment product verification and authorization using a customer identifier.

2. Description of Related Art

Conventional procedures for transaction authorizations involving a third-party payment product include a high level of involvement from a purchaser's perspective. Traditionally, consumers attempting to use a third-party payment product must know or have access to certain information regarding the payment product. If the purchaser is unable to provide this information, the transaction may not be initiated or, if initiated, may not be completed. This may discourage use of such payment products.

Merchants and their customers (purchasers, consumers, etc.) often desire to settle a transaction using third-party payment products. Payment processor organizations provide payment processing networks that facilitate verification and authorization of such payment products by the product provider. Accordingly, merchants partner with payment processors to facilitate the use of third-party payment products. Traditional processes involve a customer of a merchant providing payment product details to the merchant or the merchant's payment processor. The payment processor, using its payment processing network, then communicates with the payment product provider to verify the payment product details and request an authorization from the payment product provider to settle the transaction using the payment product.

Payment product details, however, are often very arbitrary and/or cryptic (e.g., long credit card, debit card or account numbers, CVV2 numbers, the expiration date of a credit card or debit card/account, etc.), this limitation of conventional payment processes means, practically, that customers must have physical reminders of payment product details (e.g., a physical card including the noted details). Accordingly, if a customer does not have such physical reminders available, the customer may not be able to use the desired payment product in a transaction with a merchant. Conventional systems and methods lack the ability for customers (of both a merchant and a payment product provider) to user a memorable identifier in order to facilitate payment using a third-party payment product.

SUMMARY OF THE INVENTION

In some aspects, the techniques described herein relate to a method including: receiving, by a payment product provider and from a payment processor, a customer identifier; querying, by the payment product provider, a datastore of customers of the payment product provider with a parameterized query, wherein the customer identifier is a parameter of the query; determining, based on the query, that the customer identifier is associated with customer profile data of the payment product provider; determining payment product data associated with the customer profile data; returning, by the payment product provider and to the payment processor, a positive eligibility indication based on the customer profile data and the payment product data; receiving, by the payment product provider and from the payment processor, a customer approval indication; and sending, by the payment product provider and to the payment processor, the payment product data.

In some aspects, the techniques described herein relate to a method, wherein the customer identifier includes an electronic mail address.

In some aspects, the techniques described herein relate to a method, wherein the customer identifier includes an additional piece of demographic information associated with a user.

In some aspects, the techniques described herein relate to a method, wherein the customer identifier is received as a parameter of an application programing interface (API) call to an API of the payment product provider.

In some aspects, the techniques described herein relate to a method, including: determining a trusted device associated with the customer profile data.

In some aspects, the techniques described herein relate to a method, including: pushing, by the payment product provider, in response to receiving the customer approval indication, and to an application provided by the payment product provider and executing on the trusted device, a notification message.

In some aspects, the techniques described herein relate to a method, including: receiving, by the payment product provider and in response to the notification message, an authentication of a customer associated with the customer profile data.

In some aspects, the techniques described herein relate to a method, wherein the authentication of the customer associated with the customer profile data includes a biometric authentication of the customer associated with the customer profile data.

In some aspects, the techniques described herein relate to a method, including: receiving, by the payment product provider and in response to the notification message, an indication of a payment product identified in the payment product data.

In some aspects, the techniques described herein relate to a method, including: receiving by the payment product provider and from the payment processor, a request for authorization for payment to a merchant using a payment product identified in the payment product data.

In some aspects, the techniques described herein relate to a method, including: sending, by the payment product provider and to the payment processor, the authorization for payment to a merchant using a payment product identified in the payment product data.

In some aspects, the techniques described herein relate to a system for payment product verification and authorization using a customer identifier including: a communication interface; a query engine; a datastore of customers of a payment product provider; wherein the communication interface receives from a payment processor, a customer identifier; wherein the query engine queries the datastore of customers of the payment product provider with a parameterized query, and wherein the customer identifier is a parameter of the query; wherein the query engine determines, based on the query, that the customer identifier is associated with customer profile data of the payment product provider; wherein the query engine determines, based on the query, payment product data associated with the customer profile data; wherein the communication interface returns to the payment processor, a positive eligibility indication based on the customer profile data and the payment product data; wherein the communication interface receives from the payment processor, a customer approval indication; and wherein the communication interface sends to the payment processor, the payment product data.

In some aspects, the techniques described herein relate to a system, wherein the customer identifier includes an electronic mail address.

In some aspects, the techniques described herein relate to a system, wherein the customer identifier includes an additional piece of demographic information associated with a user.

In some aspects, the techniques described herein relate to a system, wherein the communication interface includes an application programing interface (API), and wherein the customer identifier is received as a parameter of an API call to the API.

In some aspects, the techniques described herein relate to a system, wherein the query engine determines a trusted device associated with the customer profile data.

In some aspects, the techniques described herein relate to a system, wherein the communication interface pushes, in response to receiving the customer approval indication, and to an application provided by the payment product provider and executing on the trusted device, a notification message.

In some aspects, the techniques described herein relate to a system, wherein the communication interface receives, in response to the notification message, an authentication of a customer associated with the customer profile data.

In some aspects, the techniques described herein relate to a system, wherein the authentication of the customer associated with the customer profile data includes a biometric authentication of the customer associated with the customer profile data.

In some aspects, the techniques described herein relate to a system, wherein the communication interface receives, in response to the notification message, an indication of a payment product identified in the payment product data.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments disclosed herein include technological systems and methods that allow customers to provide a known identifier for verification and authorization of a payment product.

In accordance with embodiments, customer lookup, payment product verification, customer authentication, and transaction authorization using a customer identifier (e.g., an electronic mail addresses, also referred to herein as an "email" addresses) are disclosed. In an exemplary embodiment, a customer may be authenticated through a notification displayed via a payment product provider's mobile application (an "in-app" notification) executing on a trusted device. Once the customer approves the in-app notification, the payment may be processed and payment product information (e.g., credit card information) is stored for use by a payment processor at other merchants partnering with the payment processor.

Embodiments disclosed herein generally use an electronic mail address as an exemplary customer identifier. Electronic mail addresses are well-suited for use in embodiments because they are usually non-arbitrarily generated by users, and are thus memorable identifiers. Further, an electronic mail address is unique with respect to other electronic mail addresses, and therefore tends to act as good lookup key when identifying related customer data in data stores. A customer identifier, however, may be any suitable identifier, and may be generated based on a single or various data sources, in accordance with embodiments.

In accordance with an embodiment, a merchant and a customer of the merchant may enter into a transaction whereby the merchant provides goods and/or services to the customer in exchange for monetary payment from the customer. The customer, however, may wish to settle the transaction with the merchant through a third-party payment product, as opposed to settling the transaction in, e.g., physical cash. This scenario is especially convenient in e-commerce transactions where cash is not readily exchangeable, e.g., between two physical people. However, in-person transactions may also benefit from embodiments described herein through the use of various point-of-sale interfaces implementing and interreacting with the various systems and methods described herein.

Exemplary third-party payment products, include credit cards, credit accounts, debit cards, demand deposit accounts (DDAs), etc. These payment products may be provided by issuing institutions such as financial technology ("FinTech") entities, financial institutions, etc. (collectively referred to herein as "payment product providers").

The merchant may partner with a payment processing entity including a payment processing network (collectively referred to herein as a "payment processor") that interacts with the customer's payment product provider in order to facilitate payment from the customer to the merchant (e.g., a digital transfer of funds into the merchant's funds account) using the customer's preferred payment product.

Figure 1:
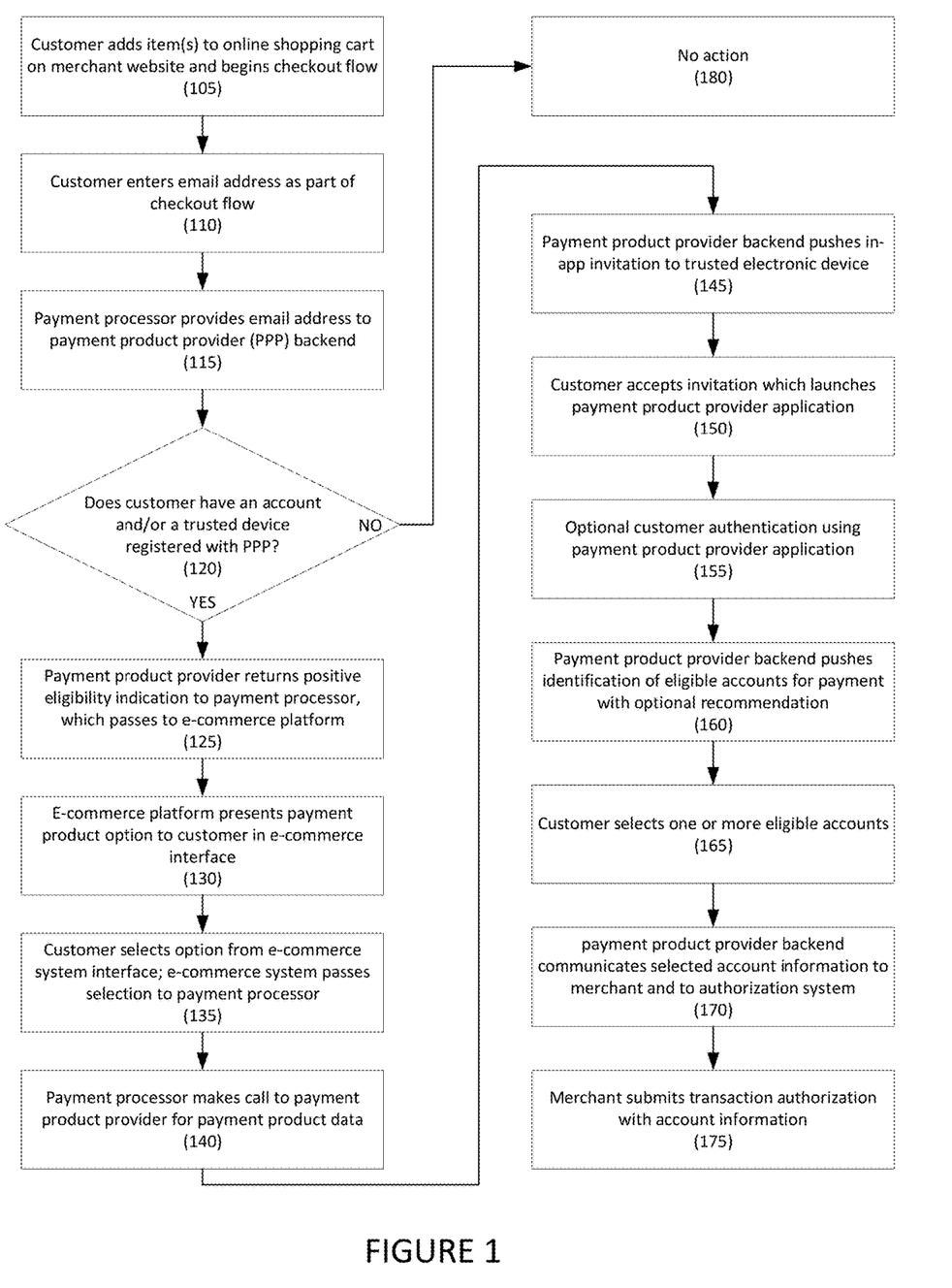
FIG. 1 is a flow chart for payment product verification and authorization using a customer identifier, in accordance with embodiments.

Referring to FIG. 1, a method for payment processing using customer identifiers (e.g., email addresses) is provided in accordance with embodiments. In step 105, a customer may add one or more items to an electronic shopping cart and may initiate a checkout flow. The electronic shopping cart may be provided, e.g., as part of an e-commerce website with which the user interacts with through an internet browser application, an e-commerce application executed by an electronic mobile device, etc.

Upon commencement of a transaction, a checkout flow may be initiated by the merchant's systems, by the merchant's payment processor partner's systems, or by a combination of systems provided by the merchant and the payment processor. In step 110 of FIG. 1, the customer may enter the customer's email address into a field provided at, e.g., an e-commerce interface of the merchant, a point-ofsale (POS) interface, etc. The email address may be passed to the payment processor for appropriate processing. In step 115, the payment processor may provide the email address to the customer's payment product provider.

In one embodiment, the merchant may also provide, to the payment processor, a merchant identifier, such as a merchant ID, a merchant name, etc. or any other suitable identifier of the merchant.

In accordance with embodiments, additional demographic data about the customer may also be collected by and/or provided to the payment processor. Exemplary demographic data includes the customer's name, the customer's address, the customer's age, the customer's sex, etc. Additional demographic data, either alone or in combination with other data, may be used to generate a customer identifier. For example, a customer identifier may be generated from a combination of an email address and a physical residence address; alternatively, a customer identifier may be generated from a combination of an email address, a name and a physical address, etc. Any suitable or desirable data or combination of data may be used to generate a customer identifier for customer lookup at the payment product providers systems.

In accordance with an embodiment, the payment product provider and/or the payment processor may expose application programing interfaces (APIs) that provide functionality for the exchange of data with other entities. For instance, an API of the payment product provider may expose programmatic methods, functions, etc., to the payment processor that allow parameters to be electronically passed to the payment product provider (sometimes referred to as an "API call"). An exemplary API call may include passing an email address as a text string to the payment product provider for processing by the payment product provider. Other API calls may accept parameters of various data types (e.g., both primitive and/or reference data types). For example, other demographic data may be passed via API calls as appropriate or desirable data types.

An API call may, by definition, return certain types of data to the caller. That is, a payment processor may send a customer identifier (e.g., an email address) as a parameter of an API call to a payment product provider and the payment product provider may respond by returning, e.g., an eligibility indication to the payment product provider. The eligibility indication may be defined as, e.g., as a Boolean data type, or some other data type, or a data type may not be specified.

With continued reference to FIG. 1, in step 120, the payment product provider may determine, based on data retained by the payment product provider, if the email address is associated with a customer profile maintained (stored by) the payment product provider and/or if the customer has a registered trusted electronic device (e.g., an electronic device having the payment product provider's application installed) associated with the customer's profile.

In accordance with an embodiment, an amount of trust assigned to an electronic device may be based on, e.g., how long the device has been registered or associated with the customer's profile, a history of logins into the payment product provider's application from the electronic device, electronic device information (e.g., whether it is updated to the most recent operating system, whether it is "jailbroken", etc.), geographical information for the electronic device, etc. In accordance with embodiments, this information may be historic data, collected in real-time, etc. Other factors may be used to determine the level of trust in the customer's electronic device as is necessary and/or desired.

If, at step 120, it is determined that the email address received from the payment processor is not associated with a payment product provider customer, and/or the customer does not have a trusted electronic device with the payment product provider's application, in step 180, the transaction may not be authorized or no action may be taken, and the customer may enter payment details manually, using an electronic wallet, inputting details from, e.g., a physical card, etc.

If it is determined that the customer identifier received from the payment processing provider is associated with a payment product provider customer and/or the customer does have a trusted electronic device registered with the payment product provider's application, then, in step 125, the payment product provider backend may return a positive eligibility indication to the payment processor. The payment processor may pass the positive eligibility indication to the e-commerce interface or POS interface used by the customer (e-commerce systems, websites, front-end technology/interfaces, etc., and POS interface, etc., are collectively referred to herein as e-commerce platforms). The e-commerce platforms may be provided by the merchant and be configured to interface with the payment processor's network and systems, or may be provided by the payment processor on behalf of the merchant and may be configured to interface with the merchant's systems.

In step 130, the e-commerce platform may receive the positive eligibility indication from the payment processor and may be configured to present an option for the customer to settle the transaction (i.e., pay the merchant) using a payment product associated with the customer's identifier (e.g., email address and/or other demographic data). Details of the payment product may be provided by the payment product provider and may presented in, for example, a checkout screen of the merchant's e-commerce system. If, in step 135, the customer accepts by selecting the presented option to use an associated payment product, in step 140, the e-commerce platform may be configured to pass this acceptance to the payment processor. The payment processor may, in turn, make a call, such as an API call, to the payment product provider's backend for payment product data.

In step 145, the payment product provider may push an in-app notification to, e.g., the trusted electronic device associated with the customer's account, which includes an invitation for the customer to pay using the payment product or products associated with the customer's identifier that was received at step 115.

In step 150, if the customer accepts the invitation, the payment product provider's mobile application ("app") may be launched on the customer's trusted device, and in step 155 the customer may be authenticated by the payment product provider's application. The authentication of step 155 is optional, and no additional authentication by the payment product provider application may be necessary.

In step 160, the payment product provider backend may push an identification of payment products eligible for payments to the merchant to the payment product provider's mobile application on the customer's trusted device. In accordance with embodiments, if more than one account is eligible, the accounts may be presented in an order based on the customer's transactions with the merchant, based on the account that provides the highest rewards, discounts, or based on any other benefit (e.g., purchase protection warranty, etc.), any current outstanding balances, etc. Any suitable factors may be considered in the account recommendation and/or presentation order, and the factors may vary or may be weighted based on the specific individual. In one embodiment, a message may be provided indicating why the one account may be preferred over the others as is necessary and/or desired.

In one embodiment, the payment product provider backend may not require the customer to select an account at the time of payment, and the financial institution backend may apply rules provided by the customer to identify the account either prior to the transaction or after the transaction.

The customer may update the account post-transaction if desired.

In step 165, the customer may select one or more accounts for the transaction displayed at the payment provider's mobile application. If the customer selects multiple accounts, the customer may enter a split percentage for splitting the payment among the respective accounts.

In step 170, the payment product provider may transmit payment product data associated with the one or more payment products selected by the customer to the payment processor and/or to the payment product provider's authorization platform(s) to augment the approval flow. For example, information about the merchant, the user, the payment provider, etc., may be provided to the authorization platform which may be used in the approval process to provide authorization of the customer-merchant transaction.

In step 175, the merchant may communicate a transaction authorization request for the transaction with the payment account(s) to the payment product provider for approval. As noted above, the information from the payment product provider backend may be used in the approval process.

In one embodiment, the payment product provider may provide universal payment account information that may be associated with two or more customer accounts. The customer may then update the account(s) for payment post-transaction.

In one embodiment, the customer may authenticate to the mobile application during the process. For example, in response to the first in-app message, the customer may be required to enter a PIN, provide a biometric (e.g., fingerprint, faceID, etc.) to authenticate to the payment product provider application before proceeding.

Figure 2:
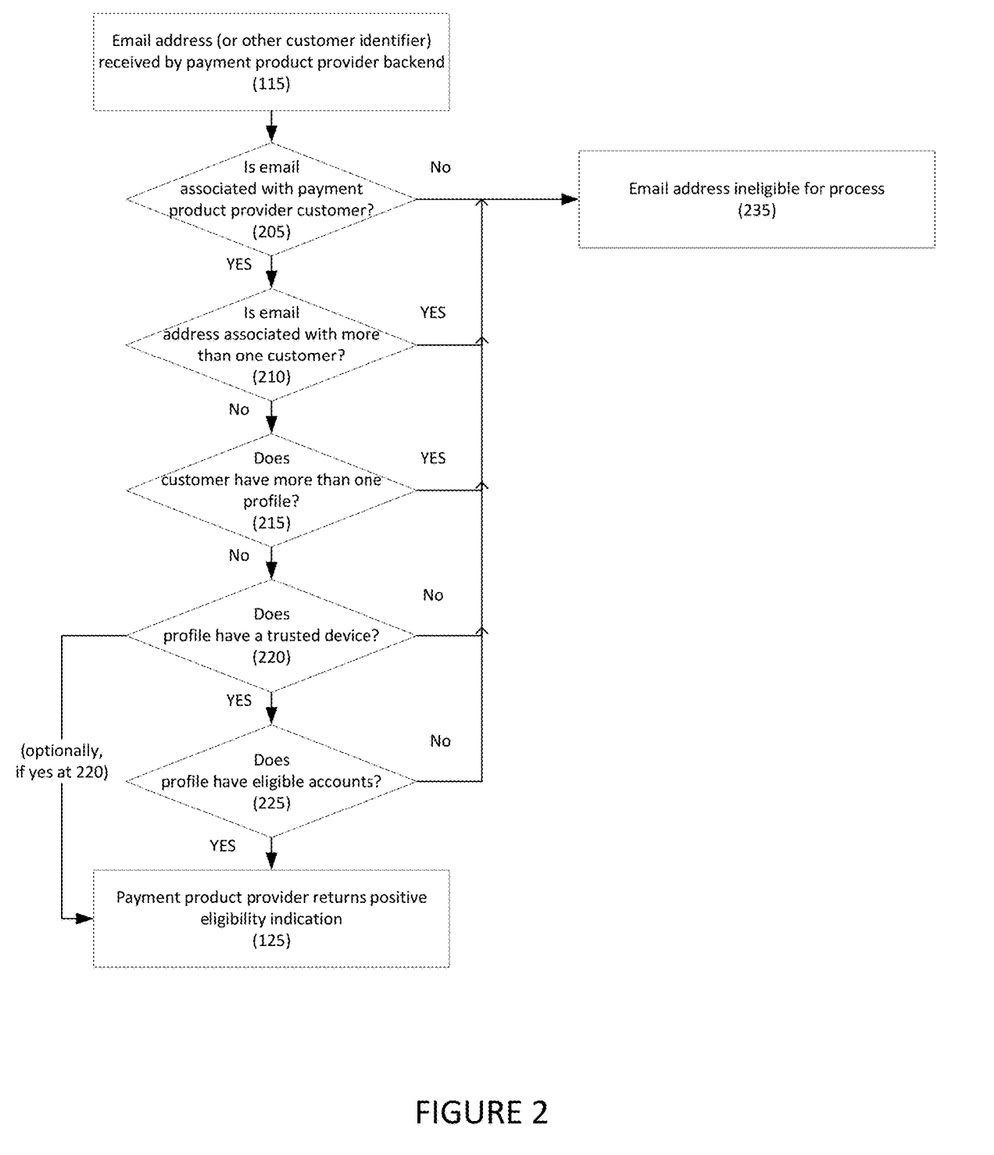
FIG. 2 is a flow chart for determining eligibility, in accordance with embodiments.

FIG. 2 depicts a method for transaction authorization using a customer identifier such as an electronic mail address, in accordance with embodiments.

Figure 3:
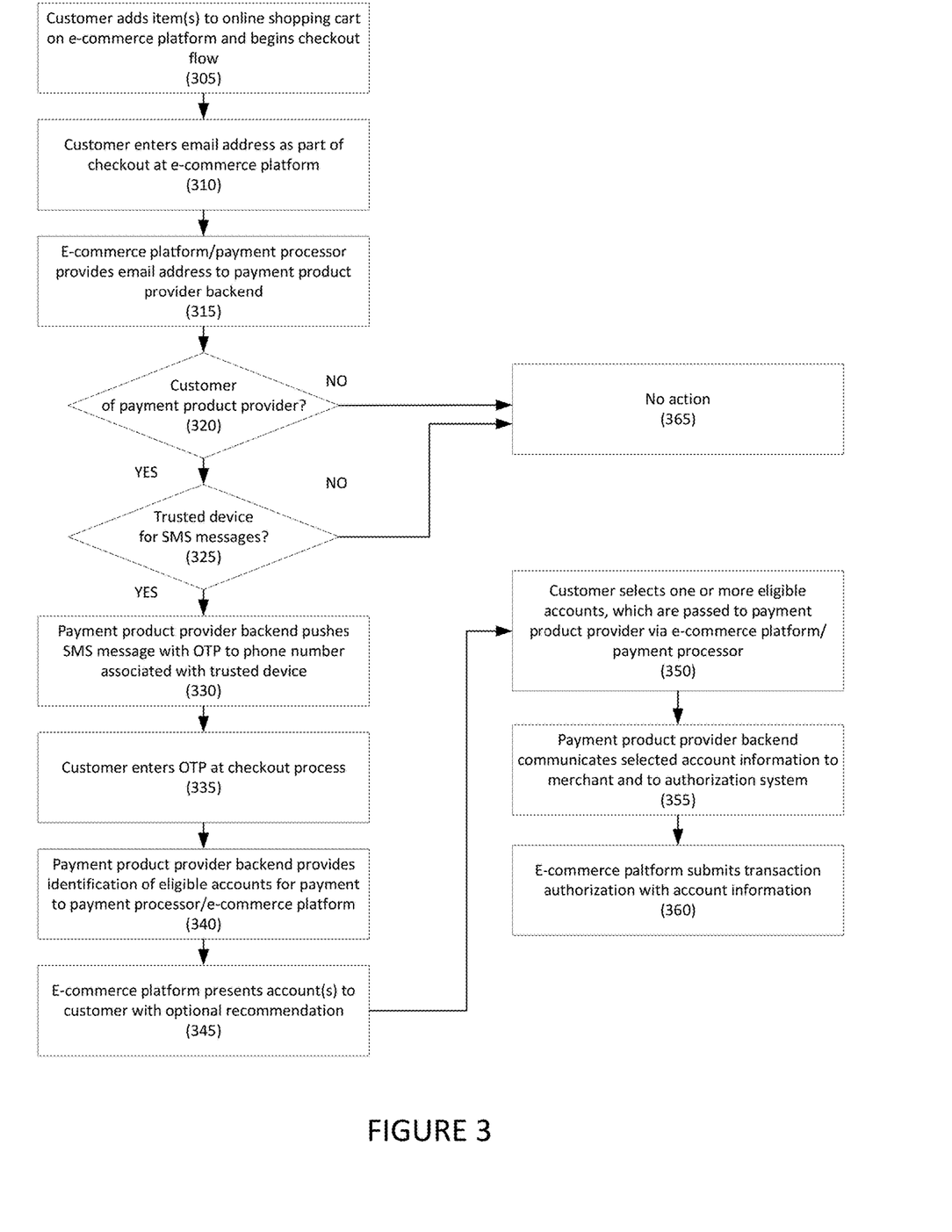
FIG. 3 is a flow chart for processing a customer identifier, in accordance with embodiments.

In accordance with an embodiment, when a payment product provider backend receives an email address (an email address is used as an exemplary customer identifier in the embodiments of FIGS. 2 and 3, but any suitable customer identifier may be used), the payment product provider backend may use logical routines to determine if the email address is associated with a payment product provider customer (step 205), if the email address is associated with more than one payment product provider customers (step 210), if the customer has more than one profile (step 215), and/or if the profile is associated with a registered trusted device (step 220). Depending on the determinations made by the payment product provider's systems made in steps 205, 210, 215, and 220, the process may halt with a determination that the email address is not eligible (and may indicate to the payment processor that payment must be made in a conventional manner (step 235)).

That is, if it is determined that the email is not associated with a profile of a payment product provider customer (step 205), and/or that the email is associated with more than one customer (step 210) or more than one customer profile (step 215), the process may halt (step 235). Further, if it is determined that an eligible customer profile does not have a registered trusted device associated with it (step 220), and/or that the profile does not have an eligible payment product associated with it (step 225), the process may also halt.

Alternatively, if it is determined that the email is associated with only one payment product provider customer (steps 205, 210), that the customer has only one profile (step 215), that there is a registered trusted device associated with the profile (step 220), and/or that the profile is associated with at least one eligible payment product (step 225), then the process may continue. e.g., to step 125 of FIG. 1, and proceed from there as indicated above.

In accordance with an embodiment, an SMS (text) message including a one-time passcode (OTP) may be sent to the customer's registered trusted device. Other types of messages, including iMessages, Rich Communication Services (RCS) messages, etc. may also be used. Referring to FIG. 3, a method for transaction authorization using an electronic mail addresses is provided in accordance with embodiments.

In step 305, a customer may in initiate an e-commerce transaction by adding one or more items to, e.g., an electronic shopping cart of an e-commerce platform and may initiate the checkout flow, and, in step 310, may enter the customer's email address into a field provided. In step 315, the e-commerce platform or payment processor may provide the email address to a payment product provider that issues payment products, such as credit cards, debit cards, etc. These steps may be similar to steps 105, 110, and 115, as disclosed above with reference to FIG. 1.

In one embodiment, the merchant may also provide a merchant identifier, such as a merchant ID, a merchant name, etc. or any other suitable identifier. Additional demographic data about the customer may also be collected by/provided to the payment processor, such as the customer's name, the customer's address, the customer's age, the customer's sex, etc. As noted above, such demographic data may be used as an alternative to, or as an addition to, an email address or other data as a customer identifier.

In step 320, the payment product provider may check to see if the email address is associated with a customer of the payment product provider. If it is determined that the provided email address is associated with a customer of the payment product provider, in step 325, a check may be made to see if the customer has a registered trusted device that includes a telephone number that is capable of receiving messages, such as SMS, iMessage, SMS, RCS, etc. The amount of trust may be based on how long the phone number has been registered, past usages of the phone number, geolocation, etc. Other factors may be used to determine the level of trust in the customer's phone number as is necessary and/or desired.

If the email address is not associated with a customer of the payment product provider, and/or the customer does not have a trusted device including a phone number capable of receiving SMS messages registered with the payment product provider's application, in step 365, no action may be taken and the customer may enter payment details manually, using an electronic wallet, etc.

If the email address is associated with a customer of the payment product provider and the customer does have a trusted electronic device with the payment product provider's application, in step 330, the payment product provider backend may push a SMS message to the phone number associated with the trusted device. The SMS message may include a one-time passcode. In step 335, the customer may enter the OTP into a field in the checkout process, and, if valid, in step 340, the payment product provider backend may send an identification of eligible accounts for payments to the payment processor/e-commerce platform.

With continued reference to FIG. 3, in step 345, the e-commerce platform may present the eligible account(s) to the customer via an interface. In one embodiment, if more than one account is eligible, the accounts may be presented in an order based on the customer's transactions with the merchant, based on the account that provides the highest rewards, discounts, or any other benefit (e.g., purchase protection warranty, etc.), any current outstanding balances, etc. Any suitable factors may be considered in the account recommendation, and the factors may vary or may be weighted based on the specific individual. In one embodiment, a message may be provided indicating why the one account may be preferred over the others as is necessary and/or desired. This may be similar to step 160, above.

In an embodiment, the payment product provider backend may not require the customer to select an account at the time of payment, and the payment product provider backend may apply rules provided by the customer to identify the account either prior to the transaction or after the transaction.

The customer may update the account post-transaction if desired.

In step 350, the customer may select one or more accounts for the transaction. If the customer provides multiple accounts, the customer may enter a split percentage for splitting the payment.

In step 355, the payment product provider backend may communicate payment information for the one or more accounts selected by the customer to the e-commerce platform and to the payment product provider's authorization platform(s) to augment the approval flow. For example, information about the merchant, the user, etc. may be provided to the authorization platform which may be used in the approval process.

In step 360, the e-commerce platform/payment processor may communicate a transaction authorization request for the transaction with the payment account(s) to the payment product provider for approval. As noted above, the information from the payment product provider backend may be used in the approval process.

In one embodiment, the payment product provider may provide universal payment account information that may be associated with two or more customer accounts. The customer may then update the account(s) for payment post-transaction.

The processes described above may be initiated or conducted on a mobile device using a merchant application or a web browser, or on a personal computer or IoT device using an application or browser. Communications to/from the payment product provider backend may be provided by in-app messages presented as banners, screens, etc., in separate browser windows, in light boxes, etc. Any suitable combination of devices and interfaces may be used as is necessary and/or desired.

Figure 4:
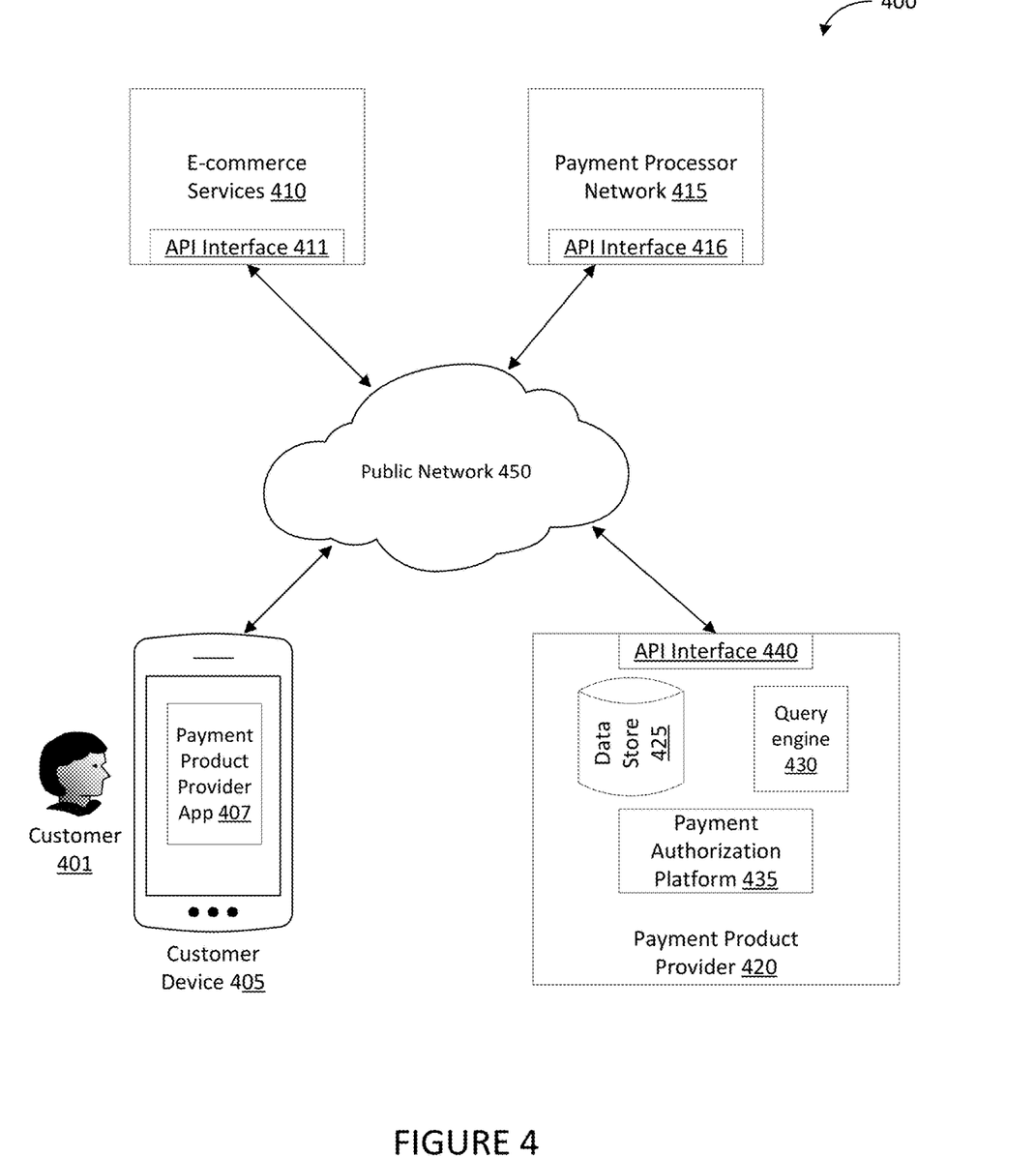
FIG. 4 is a block diagram of a system for payment product verification and authorization using a customer identifier, in accordance with embodiments.

FIG. 4 is a block diagram of a system for payment product verification and authorization using a customer identifier in accordance with embodiments.

System 400 includes customer device 405. Customer device 405 is depicted as a mobile device, but may be any suitable electronic device. For example, customer device may be a desktop computer, a laptop computer, etc. Customer device 405 may execute payment product provider application 407, and may be communicatively coupled to one or more networks, including public network 450. An exemplary public network is the Internet. Payment product provider application 407 may communicate with, e.g., payment product provider 420 via public network 450 using a system bus and network interface of customer device 405.

API interfaces 411, 416, and 440 (of e-commerce services 410, payment processor network 415 and payment product provider 420, respectively) may be any suitable communications interface and may be communicatively coupled to public network 450. API interfaces 411, 416, and 440 may be public APIs, private/partner APIs, composite APIs, etc., and may utilize any appropriate protocol, such as SOAP (Simple Object Access Protocol), XML-RPC, JSON-RPC, REST (Representational State Transfer), etc. API interfaces 411, 416, and 440 may be hosted by respective web servers communicatively coupled to public network 450.

Payment product provider 420 may include datastore 425, query engine 430, and payment authorization platform 435 in addition to API interface 440. Datastore 425 may store data such as customer profile data, payment product data, etc. Query engine 430 may receive parameters from API calls directed to API interface 440 and query datastore 425 with a parameterized query. Datastore 425, in response to the parameterized query, may return stored data related to parameters supplied by query engine 430. For instance, query engine 430 may query datastore 425 for customer profile data and/or payment product data related to a customer identifier parameter received from API interface 440.

Payment authorization platform 435 may receive, e.g., from API interface 440, data parameters needed to perform an authorization of a payment product with respect to a transaction. Payment authorization platform 435 may further send, e.g., via API interface 440 an authorization or a non-authorization to, e.g., API interface 416 of payment processor network 415.

Payment processor network 415 and e-commerce services 410 may communicate via API interface 416 and API interface 411, respectively, as indicated herein generally and with reference to FIGS. 1, 2 and 3.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method comprising:
   receiving, by a payment product provider computer including a processor and a memory, a customer identifier, wherein the payment product provider computer exposes an application programming interface, wherein the customer identifier is received as a parameter of a first call to the application programming interface, and wherein the first call to the application programming interface is received from a payment processor network, the application programming interface exposing functions used to exchange data in response to the first call;
   querying, in a query made by the payment product provider computer, a datastore of customers of the payment product provider with a parameterized query, wherein the customer identifier is a parameter of the query;
   determining, by the payment product provider computer and based on the query, that the customer identifier is associated with customer profile data of the payment product provider;
   determining, by the payment product provider computer and based on the query, payment product data associated with the customer profile data, the payment product data comprising merchant information and payment product information;
   returning, by the payment product provider computer to the payment processor network and via a response to the first call to the application programming interface, a positive eligibility indication based on the customer profile data and the payment product data;
   receiving, by the payment product provider computer, a customer approval indication, wherein the customer approval indication is received as a parameter of a second call to the application programming interface, and wherein the second call to the application programming interface is received from the payment processor network, the application programming interface exposing functions used to exchange data in response to the second call;
   determining, by the payment product provider computer, whether a device associated with the customer profile data is a trusted device based on how long a phone number of the device has been registered, a past usage of the phone number, and geolocation;
   pushing, by the payment product provider computer, in response to receiving the customer approval indication, and to an application provided by the payment product provider and executing on the trusted device, a notification message;
   receiving, by the payment product provider computer and in response to the notification message, an authentication of a customer associated with the customer profile data, wherein the authentication of the customer associated with the customer profile data comprises a biometric authentication of the customer associated with the customer profile data;
   sending, by the payment product provider computer, in response to receiving the authentication of the customer, and to the payment processor network, the payment product data; and
   receiving, by the payment product provider computer and in response to the notification message, an indication of a payment product identified in the payment product data.

2. The method of claim 1, wherein the customer identifier comprises an electronic mail address.

3. The method of claim 2, wherein the customer identifier comprises an additional piece of demographic information associated with a user.

4. The method of claim 1, wherein the notification message is a short message service (SMS) message.

5. The method of claim 1, wherein the notification message includes a one-time passcode.

6. The method of claim 1, comprising:
receiving by the payment product provider computer and from the payment processor network, a request for authorization for payment to a merchant associated with the merchant information using a payment product identified in the payment product information.

7. The method of claim 6, comprising:
sending, by the payment product provider computer and to the payment processor network, the authorization for payment to a merchant using a payment product identified in the payment product data.

8. The method of claim 1, comprising:
receiving, by the payment product provider computer, a merchant identifier.

9. A system for payment product verification and authorization using a customer identifier comprising:
a communication interface;
a query engine;
a datastore of customers of a payment product provider;
wherein the communication interface receives, the customer identifier, wherein the communication interface exposes an application programming interface, wherein the customer identifier is received as a parameter of a first call to the application programming interface, and wherein the first call to the application programming interface is received from a payment processor network, the application programming interface exposing functions used to exchange data in response to the first call;
wherein the query engine executes a query of the datastore of customers of the payment product provider with a parameterized query, and wherein the customer identifier is a parameter of the query;
wherein the query engine determines, based on the query, that the customer identifier is associated with customer profile data of the payment product provider;
wherein the query engine determines, based on the query, payment product data associated with the customer profile data, the payment product data comprising merchant information and payment product information;
wherein the communication interface returns, to the payment processor network and via a response to the first call to the application programming interface, a positive eligibility indication based on the customer profile data and the payment product data;
wherein the communication interface receives, a customer approval indication, wherein the customer approval indication is received as a parameter of a second call to the application programming interface, and wherein the second call to the application programming interface is received from the payment processor network, the application programming interface exposing functions used to exchange data in response to the second call;
wherein the communication interface determines whether a device associated with the customer profile data is a trusted device based on how long a phone number of the device has been registered, a past usage of the phone number, and geolocation;
wherein the communication interface pushes, in response to receiving the customer approval indication, and to an application provided by the payment product provider and executing on the trusted device, a notification message;
wherein the communication interface receives, in response to the notification message, an authentication of a customer associated with the customer profile data, wherein the authentication of the customer associated with the customer profile data comprises a biometric authentication of the customer associated with the customer profile data;
wherein the communication interface sends to the payment processor network, the payment product data;
wherein the communication interface receives, in response to the notification message, an indication of a payment product identified in the payment product data; and
wherein the payment product provider computer and from the payment processor network, a request for authorization for payment to a merchant associated with the merchant information using a payment product identified in the payment product information.

10. The system of claim 9, wherein the customer identifier comprises an electronic mail address.

11. The system of claim 10, wherein the customer identifier comprises an additional piece of demographic information associated with a user.

12. The system of claim 9, wherein the notification message is a short message service (SMS) message.

13. The system of claim 9, wherein the notification message includes a one-time passcode.

14. The system of claim 9, wherein the communication interface receives a merchant identifier.

* * * * *